United States Patent [19]

Kudo et al.

[11] Patent Number: 4,722,859

[45] Date of Patent: Feb. 2, 1988

[54] MAGNETIC RECORDING MEDIUM

[75] Inventors: Takanori Kudo, Kokubunji; Heigo Ishihara; Motoo Akagi, both of Tokyo, all of Japan

[73] Assignee: Hitachi, Ltd., Tokyo, Japan

[21] Appl. No.: 904,403

[22] Filed: Sep. 8, 1986

[30] Foreign Application Priority Data

Sep. 17, 1985 [JP] Japan .................................. 60-203353
Sep. 25, 1985 [JP] Japan .................................. 60-209925
Nov. 8, 1985 [JP] Japan .................................. 60-248773

[51] Int. Cl.$^4$ .......................... G11B 5/72; G11B 5/702
[52] U.S. Cl. ...................................... 428/216; 427/128; 427/131; 427/132; 428/336; 428/421; 428/422; 428/694; 428/695; 428/900; 428/409
[58] Field of Search ............... 428/695, 422, 694, 421, 428/900, 216, 336, 411.1, 409; 427/131, 128, 132; 360/134–136

[56] References Cited

U.S. PATENT DOCUMENTS

| 4,094,911 | 6/1978 | Mitsch .................... 260/448.8 |
| 4,268,556 | 5/1981 | Pedrotty ...................... 428/900 |
| 4,446,193 | 5/1984 | Afzali-Aradakani ............... 428/422 |
| 4,526,836 | 7/1985 | Mukai .......................... 428/421 |
| 4,529,659 | 7/1985 | Hoshino ........................ 428/450 |
| 4,583,145 | 4/1986 | Munnich ........................ 428/329 |

*Primary Examiner*—Ellis P. Robinson
*Attorney, Agent, or Firm*—Antonelli, Terry & Wands

[57] ABSTRACT

This invention relates to a magnetic recording medium comprising a magnetic recording film formed on a substrate directly or with a protective layer therebetween, characterized in that a surface treatment layer made of a reaction product of an azide compound is provided on the magnetic recording film, and preferably a lubricative material layer is further provided on the surface treatment layer. The surface treatment agent is covalently bonded to the surface of the magnetic recording film with an aid of nitrene to improve the durability of the magnetic recording film.

3 Claims, No Drawings

MAGNETIC RECORDING MEDIUM

BACKGROUND OF THE INVENTION

This invention relates to a magnetic recording medium. More particularly, it relates to a magnetic recording medium having long life and suited for application to magnetic discs, magnetic drums, magnetic tapes, magnetic cards and like devices.

Generally, magnetic recording media comprise a magnetic layer (a magnetic recording film) formed on various types of substrate made of organic or inorganic material. In use of such magnetic recording media for magnetic recording or reproduction, the surface of the magnetic layer is forced into a frictional contact with a magnetic recording head. The lowering of performance due to the wear of the magnetic layer caused by such frictional contact poses a serious problem for the magnetic recording media. For instance, in a magnetic disc device, when it is in normal operation, the magnetic head is in a state of being floated up under the floating force of an air film which is formed on the rotating disc surface. However, at the start or stoppage of rotation of the magnetic disc when no floating force is afforded or the floating force dies down, the magnetic head and the disc are brought into a contact sliding state. For reducing the wear of the magnetic recording medium in such contact sliding state to retain the floating characteristics of the magnetic head, it needs to provide a lubricant layer which firmly adheres to the magnetic recording film. It is known to provide a surface treatment layer on the magnetic recording film for improving the adhesion of the lubricant, as for instance disclosed in Japanese Patent Kokai (Laid-Open) No. 164430/82. This treatment consists in combining a fluorinated alkane such as tetrafluoroethylene teromer used as lubricant and a fluorine-containing surface treatment agent, but since such treatment can merely afford physical bond between the surface treatment agent and the magnetic layer, it proves unable to provide a satisfactorily strong bond between the surface treatment agent and the magnetic recording film, resulting in unsatisfactory wear resistance of the magnetic layer and unimproved durability of the magnetic recording medium.

SUMMARY OF THE INVENTION

An object of this invention is to provide a magnetic recording medium having improved wear resistance in its magnetic recording film and long life.

This and other objects of the invention can be attained by providing a magnetic recording medium comprising a magnetic recording film formed on a substrate directly or with a protective layer therebetween, characterized by having a surface treatment layer made of a reaction product of an azide compound on said magnetic recording film and a lubricant layer on said surface treatment layer.

DETAILED DESCRIPTION OF THE PREFERRED EMBODIMENTS

Generally, a lubricant which can easily adhere to the sliding object surfaces and is also easily sheared in the direction of friction is considered as the lubricant which can work effectively for the proper purpose and can also afford wear resistance to the sliding objects. In the prior art, it was possible to improve wear resistance to some degree by using certain materials such as higher fatty acids (and their derivatives), silicone oil, fluorinated oil and the like as lubricant, but none of the proposed lubricant materials was well satisfactory and further improvement has been required.

As a result of persistent studies on the subject matter, the present inventors found that the wear resistance of the surface of the magnetic layer of a magnetic recording medium is greatly improved to provide the medium with excellent durability that could never be achievable with the prior art by applying a surface treatment which comprises decomposing a specific fluorine-containing azide compound on the surface of the magnetic layer (which is a magnetic recording film) and bonding said fluorine-containing azide compound to the surface of said magnetic layer with the aid of the produced nitrene, and preferably by further providing a layer of a fluorine-containing lubricative material on the treated surface of the magnetic layer. This remarkable finding was materialized as the present invention.

In the magnetic recording medium according to this invention, the surface treatment agent having a molecular structure similar to that of the lubricative material is covalently bonded to the magnetic layer surface through the intermediate of nitrene, while the lubricative material is bonded to the surface treatment agent by strong intermolecular force as they have a similar molecular structure and hence good intermolecular compatibility. Therefore, the layer of the lubricative material is sheared on contact with an object and easily rebonded to the treated surface layer to provide a magnetic recording medium having excellent sliding resistance and long life quite inconceivable with the conventional products.

The invention will be described in further detail hereinbelow.

In the magnetic recording medium according to this invention, the material used as the surface treatment agent for the magnetic layer forming a magnetic recording film is selected from the compounds having as a fundamental skelton partially or wholly flourinated alkyl chains or perfluoroalkyl polyether chains and which also have at least one azido group. Said fluorinated alkyl chains may not necessarily be straight chains; they may be branched. Some typical examples of the azides having said fluorinated alkyl chains as backbone are listed below.

$(CF_3)_2CFO(CH_2)_3N_3$,
$n\text{-}C_6F_{13}(CH_2)_6N_3$,
$(CF_3)_2CFCF_2(CH_2)_5N_3$,
$F(CF_2)_7(CH_2)_{11}N_3$,
$F(CF_2)_5CFHCF_2N_3$,
$F(CF_2)_{12}(CH_2)_{12}N_3$,
$N_3(CH_2)_6(CF_2)_6(CH_2)_6N_3$,

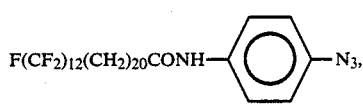

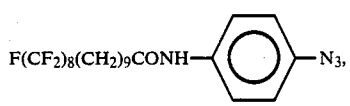

In said type of azides, a functional group absorbent of ultraviolet rays such as unsaturated bond or aromatic ring may be introduced to the neighborhood of azido group (N$_3$-).

Said perfluoroalkyl polyether chains may not necessarily be straight but may be branched. As examples of the compounds having said perfluoroalkyl polyether chains as basic structure and also having at least one azido group, the following compounds may be referred to:

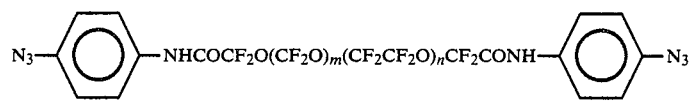

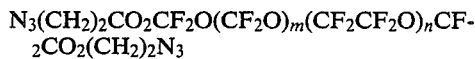

N$_3$(CH$_2$)$_2$CO$_2$CF$_2$O(CF$_2$O)$_m$(CF$_2$CF$_2$O)$_n$CF$_2$CO$_2$(CH$_2$)$_2$N$_3$

N$_3$(CH$_2$)$_{11}$CF$_2$O(CF$_2$O)$_m$(CF$_2$CF$_2$O)$_n$CF$_2$(CH$_2$)$_{11}$N$_3$

In said type of compounds, a functional group absorbent of ultraviolet rays such as unsaturated bond or aromatic ring may be introduced to the neighborhood of azido group.

Suitable methods may be used for applying these azide compounds as a surface treatment agent to the magnetic recording medium of this invention. For instance, said compound may be directly applied to a magnetic disc or tape or sprayed as a solution on said magntic disc or tape, followed by proper wiping to effect desired deposition of the compound. Then the azido groups of said surface treatment agent are decomposed by ultraviolet-light irradiation or by heating to produce nitrene which helps to effectuate covalent bonding of said agent to the surface of the magnetic layer.

The lubricative material applied to the surface treatment layer in this invention is selected from the partially or wholly fluorinated alkanes or perfluoroalkyl polyethers and their derivatives. Typical examples of said perfluoroalkyl polyethers are polyhexafluoropropylene oxide, polytetrafluoroethylene oxide and their derivatives, for example, their derivatives of carboxylic acids, and the like.

The following compounds can be referred to as typical examples of the compounds usable as lubricative material in this invention:

CF$_3$O(C$_2$F$_4$O)$_m$(CF$_2$O)$_n$CF$_3$ (average molecular weight: 800, m/n=0.7), F[CF(CF$_3$)CF$_2$O]$_n$CF(CF$_3$)CO$_2$H (average molecular weight: 3,200), F[CF(CF$_3$)CF$_2$O]$_n$CF(CF$_3$)CO$_2$Li (average molecular weight: 3,200),

F(CF$_2$)$_7$(CH$_2$)$_{12}$H,

F(CF$_2$)$_6$(CH$_2$)$_6$H,

F(CF$_2$)$_{10}$F.

The thickness of the surface treatment layer in this invention is preferably in the range from 5 to 500 Å, more preferably from 20 to 250 Å. If the thickness of said layer is less than 5 Å, no satisfactory bonding thereof to the magnetic layer may be provided because of poor coating condition, while if said thickness exceeds 500 Å, the spacing between the magnetic head and the recording medium will become too large, causing an increased loss of reproducing output.

The thickness of the lubricative material layer in this invention is preferably in the range from 20 to 500 Å, more preferably from 30 to 250 Å, for the reason that the thickness of less than 20 Å can not provide enough coating of lubricant for obtaining the desired effect of lubrication, while the thickness exceeding 500 Å causes an increase of reproducing output loss because of too large spacing between the magnetic head and the recording medium.

The combined thickness of the surface treatment layer and the lubricative material layer in this invention is preferably not less than 30 Å for the reason of uniformity and strength of the layers. The upper limit thereof is preferably not greater than 500 Å for minimizing the loss of reproducing output due to spacing between the magnetic head and the recording medium.

As the magnetic layer in the magnetic recording medium according to this invention, there can be used a magnetic film of a metal such as Co-Cr alloy, Co-Ni alloy, Co-Fe alloy, Co-P alloy and the like, or a magnetic film containing magnetic powder of an oxide such as $\gamma$-Fe$_2$O$_3$, Co-containing $\gamma$-Fe$_2$O$_3$, Fe$_3$O$_4$, Co-containing $\gamma$-Fe$_2$O$_3$, CrO$_2$ and the like, or magnetic powder of a metal such as Fe, Co, Ni, etc., or their alloys. In the magnetic recording medium according to this invention, a protective layer may be further provided on said magnetic recording film.

The present invention will hereinafter be described in more detail by referring to the embodiments thereof.

EXAMPLES 1-17

The types of surface treatment agent used for the surface treatment of the magnetic layer (magnetic recording film) in Examples 1-17 are shown in Table 1.

TABLE 1

| | Surface treatment agent |
|---|---|
| I | F(CF$_2$)$_7$(CH$_2$)$_{11}$N$_3$ |
| II | F(CF$_2$)$_5$CFHCF$_2$H$_3$ |
| III | F(CF$_2$)$_{12}$(CH$_2$)$_{12}$N$_3$ |
| IV | N$_3$(CH$_2$)$_6$(CF$_2$)$_6$(CH$_2$)$_6$N$_3$ |
| V | 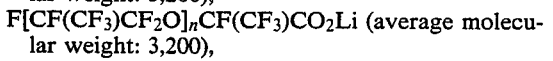 |
| VI |  |

The types of lubricative material used in Examples 1-17 of this invention are shown in Table 2.

TABLE 2

| Lubri- | A | CF$_3$O(C$_2$F$_4$O)$_m$(CF$_2$O)$_n$CF$_3$ |
| cative | | (average molecular weight: 8000, |

TABLE 2-continued

| material | | |
|---|---|---|
| | | m/n = 0.7) |
| | B | $F[CF(CF_3)CF_2O]_nCF(CF_3)CO_2H$ |
| | | (average molecular weight: 3200) |
| | C | $F[CF(CF_3)CF_2O]_nCF(CF_3)CO_2Li$ |
| | | (average molecular weight: 3200) |
| | D | $F(CF_2)_7(CH_2)_{12}H$ |
| | E | $F(CF_2)_6(CH_2)_6H$ |
| | F | $F(CF_2)_{10}F$ |
| | G | Stearic acid |
| | H | n-Butyl arachinate |
| | I | Silicone oil |
| | | (dimethyl polysiloxane, average molecular weight: 1000) |

In Run Nos. 1–14 of this invention and in Run Nos. 10–12 of comparison, a 5-inch diameter coating magnetic disc made by dispersing a magnetic powder ($\gamma$-$Fe_2O_3$) in a binder consisting of an epoxy, a phenol and polyvinyl butyral resins was used as magnetic recording medium, and each of the surface treatment agents shown in Table 1 was coated on said magnetic disc to a predetermined thickness and heated in a nitrogen atmosphere at a temperature of about 150° C. for about 30 minutes. There were used two surface treatment methods: in one method, said magnetic disc, before coated with the lubricative material, was subjected to ultrasonic cleaning in a Freon solution for 10 minutes to remove the unreacted surface treatment agent, thus forming a surface treatment layer directly chemically bonded to the magnetic recording medium, this method being called treating method (2), and in the other method, the lubricative material was coated without Freon cleaning, this method being called treating method (1). Coating of the lubricative material was made by spraying a Freon solution of said material and then wiping out the excess lubricative material with a gauze tape by rotating the magnetic disc until the layer of the lubricative material came to have a predetermined thickness.

The thickness of the surface treatment layer and the lubricative material layer was measured by a Fourier transform infrared spectrometer (FT-IR spectometer).

For determining the endurance to sliding against the magnetic head, the magnetic disc made by said method was slided repeatedly at a sliding speed of 10 m/s against an $\alpha$-$Al_2O_3$ slider (a spherical slider having a radius of curvature of 30 mm) applied with a load of 20 g, and the number of times of repetition of sliding till causing a flaw on the surface of the magnetic recording medium was counted to thereby evaluate the durability.

In Run Nos. 8–14 of this invention, the surface treatment was made by exposure to a 600 W Hg-Xe lamp (UV) instead of heating.

In Run Nos. 1–9 of comparison, specimens having a predetermined thickness of lubricative material layer were prepared according to the method used in Run Nos. 1–14 of this invention but without conducting surface treatment with said surface treatment agents, and their sliding endurance was determined by said test method.

In Run Nos. 15–17 of this invention, magnetic discs were made by forming a 0.3 $\mu$m thick Co-Cr magnetic film on a glass substrate by RF sputtering in Ar gas, and these magnetic discs were surface treated with a surface treatment agent and coated with a lubricative material layer according to the method of Run Nos. 1–14 of this invention to prepare the specimens. Said slide test method was used for determining the sliding endurance of these specimens.

In Run Nos. 13–14 of comparison, specimens were prepared by coating a lubricative material by the method of Run Nos. 1–12 of comparison on the surface of a Co-Cr magnetic film formed by the method of Run Nos. 15–17 of this invention. Sliding endurance was determined in the same way as said above.

The test results in the runs of this invention and in the comparative runs are shown in Tables 3, 4 and 5.

TABLE 3

| Run No. of this invention | Run No. of comparison | Surface treatment agent (shown in Table 1) (Treating method & film thickness Å) | Lubricative material (shown in Table 2) (Film thickness Å) | Surface treatment | Sliding endurance ($\times 10^3$ times) |
|---|---|---|---|---|---|
| 1 | — | I [(1), 60] | A (98) | Heating | 23.5 |
| 2 | — | III [(1), 62] | A (95) | Heating | 24.2 |
| 3 | — | IV [(1), 58] | A (110) | Heating | 26.8 |
| 4 | — | VI [(1), 58] | A (105) | Heating | 25.6 |
| 5 | — | I [(2), 23] | A (145) | Heating | 23.2 |
| 6 | — | III [(2), 20] | A (151) | Heating | 23.7 |
| 7 | — | VI [(2), 21] | A (145) | Heating | 24.8 |
| — | 1 | None | A (167) | — | 2.4 |

TABLE 4

| Run No. of this invention | Run No. of comparison | Surface treatment agent (shown in Table 1) (Treating method & film thickness Å) | Lubricative material (shown in Table 2) (Film thickness Å) | Surface treatment | Sliding endurance ($\times 10^3$ times) |
|---|---|---|---|---|---|
| 8 | — | VI [(2), 15] | A (150) | UV | 24.6 |
| 9 | — | VI | B | UV | 27.6 |

TABLE 4-continued

| Run No. of this invention | Run No. of comparison | Surface treatment agent (shown in Table 1) (Treating method & film thickness Å) | Lubricative material (shown in Table 2) (Film thickness Å) | Surface treatment | Sliding endurance ($\times 10^3$ times) |
| --- | --- | --- | --- | --- | --- |
| 10 | — | VI [(2), 19] | C (135) | UV | 25.2 |
| 11 | — | VI [(2), 24] | D (130) | UV | 24.3 |
| 12 | — | VI [(2), 26] | E (135) | UV | 23.1 |
| 13 | — | VI [(2), 18] | F (136) | UV | 22.2 |
| 14 | — | VI [(2), 30] | F (128) | UV | 21.9 |
| — | 2 | None | B (131) | — | 3.6 |
| — | 3 | None | C (152) | — | 6.6 |
| — | 4 | None | D (158) | — | 4.8 |
| — | 5 | None | E (162) | — | 5.7 |
| — | 5 | None | F (153) | — | 3.8 |
| — | 7 | None | G (150) | — | 2.3 |
| — | 8 | None | H (159) | — | 4.2 |
| — | 9 | None | F (162) | — | 6.7 |
| — | 10 | VI [(2), 22] | G (156) | UV | 7.8 |
| — | 11 | VI [(2), 23] | H (135) | UV | 8.5 |
| — | 12 | VI [(2), 20] | I (138) | UV | 12.7 |

TABLE 5

| Run No. of this invention | Run No. of comparison | Surface treatment agent (shown in Table 1) (Treating method & film thickness Å) | Lubricative material (shown in Table 2) (Film thickness Å) | Surface treatment | Sliding endurance ($\times 10^3$ times) |
| --- | --- | --- | --- | --- | --- |
| 15 | — | I [(2), 60] | A (105) | Heating | 7.6 |
| 16 | — | IV [(2), 60] | C (100) | Heating | 12.7 |
| 17 | — | VI [(2), 60] | F (138) | UV | 11.2 |
| — | 13 | None | A (175) | — | 1.2 |
| — | 14 | None | F (168) | — | 0.8 |

As seen from Table 3, in the case of Run Nos. 1–4 of this invention where the layer, composed of a lubricative material layer and a surface treatment layer, of about the same thickness as the lubricative material layer of comparative Run No. 1 were provided, the sliding endurance was improved by about one figure (in the number of times of repetition of sliding endured) over comparative Run No. 1 where no surface treatment was made.

Also, from a comparison of Run Nos. 1–4 and Run Nos. 5–7 of this invention, it is noted that the treating method (2) can produce the substantially same effect as the treating method (1).

Further, by comparing Run Nos. 8–14 of this invention shown in Table 4 and Run Nos. 5–7 of this invention shown in Table 3, it is seen that the UV treatment can give the same effect as heating.

In case a layer of a non-fluoro lubricative material is provided on the fluorine-containing surface treatment layer of this invention, no significant improvement of sliding endurance is obtained even if the surface treatment layer of this invention is used as seen from comparative Run Nos. 7–9 and 10–12. An appreciable improvement of sliding endurance can be obtained only when the surface treatment layer of this invention and a fluorine-type lubricative material layer are combined.

It is also seen from Run Nos. 15–17 of this invention shown in Table 5 that in accordance with this invention the same effect as produced with the coating magnetic film can be obtained by using a metallic magnetic film.

As appreciated from the foregoing explanations of the Examples, any of the magnetic discs made according to the method of this invention exhibits excellent endurance to sliding against magnetic head, indicating their splended durability in use as a magnetic recording medium.

EXAMPLES 18-34

First, the methods for synthesizing the azide compounds having perfluoroalkyl polyether chains, which are the novel materials, are shown below.

SYNTHESIS EXAMPLE 1

A 1,1,2-trichlorotrifluoroethane (Freon) solution of polyhexafluoropropylene oxide-ω-carboxylic acid (Krytox 157FS made by E. I. du Pont De Nemours and Co.) was dried and then treated with thionyl chloride to obtain an acid chloride of the following chemical formula:

$$F[CF(CF_3)CF_2O]_nCF(CF_3)COCl \quad (1)$$

This compound (1) was made into a Freon solution and added with a diethyl ether solution of p-azidoaniline. The mixed solution was stirred at room temperature and then the solvent was distilled off to obtain an azide having the following chemical formula:

(2)

By using 2-azidoethanol in place of p-azidoaniline in the above process, there was obtained an azide having the following chemical formula:

$$F[CF(CF_3)CF_2O]_nCF(CF_3)CO_2(CH_2)_2N_3 \quad (3)$$

SYNTHESIS EXAMPLE 2

Krytox 157FS and silver oxide were dissolved in dry Freon and the mixture was stirred at room temperature, after which the unreacted silver oxide was filtered out and the solvent was distilled off to obtain a silver salt. This silver salt was heated in the presence of iodine for decarboxylation to obtain an iodide having the following chemical formula:

$$F[CF(CF_3)CF_2O]_nCF(CF_3)I \quad (4)$$

This compound (4) and 10-undecene-1-ol were heated together with 2,2'-azoisobutyronitrile (AIBN) in a nitrogen atmosphere to obtain a compound of the following formula:

$$F[CF(CF_3)CF_2O]_nCF(CF_3(CHCH(I)(CH_2)_9OH$$

This compound was treated with lithium aluminum hydride, hydrobromic acid and sodium azide successively in this order to obtain an azide having the following chemical formula:

$$F[CF(CF_3)CF_2O]_nCF(CF_3)(CH_2)_{11}N_3 \quad (5)$$

By following the above process but by using perfluoroalkyl polyethers of the following formula:

$$HO_2CCF_2O(CF_2O)_m(CF_2CF_2O)_nCF_2CO_2H$$

in place of Krytox 157FS, there were obtained the azide compounds having the following chemical formulae (6), (7) and (8):

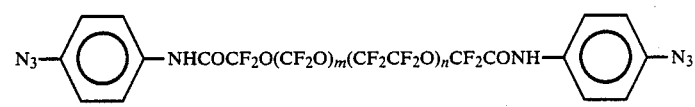
(6)

$$N_3(CH_2)_2CO_2CF_2O(CF_2O)_m(CF_2CF_2O)_nCF_2CO_2(CH_2)_2N_3 \quad (7)$$

$$N_3(CH_2)_{11}CF_2O(CF_2O)_m(CF_2CF_2O)_nCF_2(CH_2(CH_2)_{11}N_3 \quad (8)$$

The structures of the chemical formulae (1)–(8) were confirmed by IR and NMR spectra.

In the present Examples of this invention, the azide compounds having perfluoroalkyl polyether chains of this invention shown in Table 6 were used as surface treatment agent, while the compounds shown in Table 2 were used as lubricative material.

TABLE 6

| | Surface treatment agent |
|---|---|
| XI | $F[CF(CF_3)CF_2O]_nCF(CF_3)(CH_2)_{11}N_3$ (av. mol. wt.: 2500) |
| XII | $F[CF(CF_3)CF_2O]_nCF(CF_3)CO_2(CH_2)_2N_3$ (av. mol. wt.: 2500) |
| XIII | 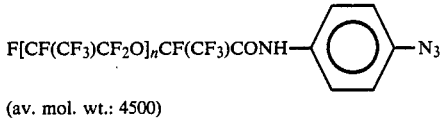 (av. mol. wt.: 4500) |
| XIV | 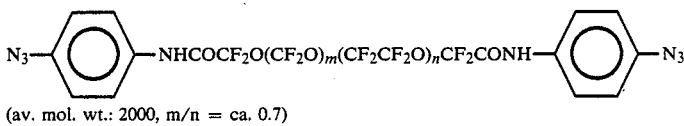 (av. mol. wt.: 2000, m/n = ca. 0.7) |
| XV | $N_3(CH_2)_2CO_2CF_2O(CF_2O)_m(CF_2CF_2O)_nCF_2CO_2(CH_2)_2N_3$ (av. mol. wt.: 2000, m/n = ca. 0.7) |
| XVI | $N_3(CH_2)_{11}CF_2O(CF_2O)_m(CF_2CF_2O)_nCF_2(CH_2)_{11}N_3$ |

TABLE 6-continued

| Surface treatment agent |
|---|
| (av. mol. wt.: 2000, m/n = ca. 0.7) |

In Run Nos. 18–31 of this invention, there were used 5-inch diameter coating magnetic discs made by dispersing a magnetic powder ($\gamma$-$Fe_2O_3$) in a binder composed of an epoxy, a phenol and a polyvinyl butyral resins, and the surface treatment agents shown in Table 6 were coated on said respective magnetic discs to a predetermined thickness and heated in a nitrogen atmosphere at about 150° C. for about 30 minutes. The surface treatment was made by the following two methods: in one method, said magnetic discs, before coating with the lubricative material, were subjected to 10-minute ultrasonic cleaning in a Freon solution to remove the unreacted surface treatment agent, thus forming a surface treatment layer directly chemically bonded to the magnetic recording medium, this method being called the treating method (2), and in the other method, said discs were coated with the lubricative material without Freon cleaning, this method being called the treating method (1).

Coating of the lubricative material was carried out by spraying a Freon solution of said lubricative material and then wiping out the excess lubricative material with a gauze tape by rotating the magnetic disc until the layer of the lubricative material came to have a predetermined thickness.

The thickness of the surface treatment layer and the lubricative material layer was measured by an FT-IR spectrometer.

For determining the sliding endurance against the magnetic head, the magnetic disc made by said method was slided repeatedly at a sliding speed of 10 m/s against an $\alpha$-$Al_2O_3$ slider (a spherical slider having a radius of curvature of 30 mm) loaded with a weight of 20 g, and the number of times of repetition of sliding till causing a flaw on the surface of the magnetic recording medium was counted.

In Run Nos. 25–31 of this invention, the coated discs were exposed to a 600 W Hg-Xe lamp (UV) instead of conducting the heat treatment.

In Run Nos. 15–23 of comparison, specimens were prepared according to the method of Run Nos. 18–31 of this invention without undergoing surface treatment with said surface treatment agents, and the sliding endurance was determined by the same test method as said above.

In Run Nos. 32–34 of this invention, specimens of magnetic recording medium were prepared by using the magnetic discs made by forming a 0.3 $\mu$m thick Co-Cr magnetic film on a glass substrate by RF sputtering in Ar gas, and subjecting said discs to coating and treatment with the surface treatment agents and further coating with the lubricative materials according to the method of Run Nos. 15–23 of this invention. The sliding endurance was determined by said test method.

In comparative Run Nos. 24–25, specimens were prepared by coating the lubricative materials in the same way as in said comparative Run Nos. 15–23 on the surface of a Co-Cr magnetic film made by the method of Run Nos. 32–34 of this invention, and their sliding endurance was determined by said test method.

The test results are shown in Tables 7, 8 and 9.

TABLE 7

| Run No. of this invention | Run No. of comparison | Surface treatment agent (shown in Table 6) (Treating method & film thickness Å) | Lubricative material (shown in Table 2) (Film thickness Å) | Surface treatment | Sliding endurance ($\times 10^3$ times) |
|---|---|---|---|---|---|
| 18 | — | XI [(1) 58] | A (100) | Heating | 34.1 |
| 19 | — | XII [(1) 60] | A (95) | Heating | 34.2 |
| 20 | — | XV [(1) 60] | A (110) | Heating | 38.2 |
| 21 | — | XVI [(1) 61) | A (108) | Heating | 35.8 |
| 22 | — | XI [(2), 24] | A (150) | Heating | 34.1 |
| 23 | — | XII [(2), 26] | A (147) | Heating | 34.7 |
| 24 | — | XV [(2), 22] | A (150) | Heating | 35.5 |
| — | 15 | None | A (167) | — | 2.4 |

TABLE 8

| Run No. of this invention | Run No. of comparison | Surface treatment agent (shown in Table 1) (Treating method & film thickness Å) | Lubricative material (shown in Table 2) (Film thickness Å) | Surface treatment | Sliding endurance ($\times 10^3$ times) |
|---|---|---|---|---|---|
| 25 | — | XIII [(2), 35] | A (148) | UV | 35.1 |
| 26 | — | XIII [(2), 20] | B (137) | UV | 38.7 |
| 27 | — | XIII [(2), 26] | C (132) | UV | 42.1 |
| 28 | — | XIII | D | UV | 32.7 |

TABLE 8-continued

| Run No. of this invention | Run No. of comparison | Surface treatment agent (shown in Table 1) (Treating method & film thickness Å) | Lubricative material (shown in Table 2) (Film thickness Å) | Surface treatment | Sliding endurance ($\times 10^3$ times) |
| --- | --- | --- | --- | --- | --- |
| 29 | — | [(2), 24] XIII | (136) E | UV | 31.9 |
| 30 | — | [(2), 23] XIII | (137) F | UV | 29.8 |
| 31 | — | [(2), 22] XIII | (129) F | UV | 30.5 |
| — | 16 | [(2), 20] None | (132) B | — | 3.6 |
| — | 17 | None | (152) C | — | 6.6 |
| — | 18 | None | (158) D | — | 4.8 |
| — | 19 | None | (162) E | — | 5.7 |
| — | 20 | None | (153) F | — | 3.8 |
| — | 21 | None | (150) G | — | 2.3 |
| — | 22 | None | (159) H | — | 4.2 |
| — | 23 | None | (162) F | — | 6.7 |
|   |   |   | (156) |   |   |

TABLE 9

| Run No. of this invention | Run No. of comparison | Surface treatment agent (shown in Table 6) (Treating method & film thickness Å) | Lubricative material (shown in Table 2) (Film thickness Å) | Surface treatment | Sliding endurance ($\times 10^3$ times) |
| --- | --- | --- | --- | --- | --- |
| 32 | — | XI [(1) 60] | A (107) | Heating | 12.8 |
| 33 | — | XVI [(1) 60] | C (105) | Heating | 14.1 |
| 34 | — | XIV [(2), 21] | F (140) | UV | 13.6 |
| — | 24 | None | A (175) | — | 1.2 |
| — | 25 | None | F (168) | — | 0.8 |

As seen from Table 7, in Run Nos. 18–21 of this invention where the layer, composed of a lubricative material layer and a surface treatment layer, of about the same thickness as the lubricative material layer of comparative Run No. 15 were provided, the sliding endurance was improved by about one figure (in the number of times or repetition of sliding endured) over the comparative run.

As noted from a comparison of Run Nos. 18–21 and Run Nos. 22–23 of this invention, the surface treating method (2) can produce the same effect as the treating method (1).

Comparison of Run Nos. 25–31 of this invention shown in Table 8 and run Nos. 22–24 of this invention shown in Table 7 shows that the surface treatment by UV can produce the same effect as by heating.

Also, combination of the surface treatment layer of this invention with a fluorine-type lubricative material can greatly improve the sliding endurance of the product.

Further, as seen from Run Nos. 32–34 of this invention shown in Table 9, in accordance with this invention the same effect as provided with a coating magnetic film can be obtained by using a metallic magnetic film.

As described above in detail, in the magnetic recording medium according to this invention, a surface treatment agent having a molecular structure similar to that of the lubricative material is firmly covalently bonded to the surface of the magnetic layer (magnetic recording film) through the medium of nitrene, while the lubricative material is strongly bonded to the surface treatment agent by dint of intermolecular force, so that the magnetic recording medium of this invention is highly resistant to wear at its magnetic layer and has excellent durability. Also, said effect of this invention is produced not only in application to coating magnetic recording media and Co-Cr sputtered metallic magnetic recording media described above but also in adaptation to other types of metallic magnetic films formed by plating, vacuum deposition, etc., and thus the present invention has a wide scope of practical use and is of great industrial utility value.

What is claimed is:

1. A magnetic recording medium comprising a magnetic recording film formed on a substrate directly or with a protective layer therebetween, characterized in that a surface treatment layer having a thickness in the range of 5 to 500 Å and being made of a reaction product of an azide compound having as a fundamental skeleton partially or entirely fluorinated alkyl chain and at least one azido group is provided on said magnetic recording film directly or on a protective layer formed on said magnetic recording film, and a layer of a lubricative material having a thickness in the range of 20 to 500 Å and being made of a perfluoroalkyl polyether or a partially or entirely fluorinated alkane is provided on said surface treatment layer.

2. A magnetic recording medium comprising a magnetic recording film formed on a substrate directly or with a protective layer therebetween, characterized in that a surface treatment layer having a thickness in the range of 5 to 500 Å and being made of a reaction product of a fluorinecontaining azide compound having perfluoroalkyl polyether chains and also having at least one azido group is provided on said magnetic recording film directly or on a protective layer formed on said magnetic recording film, and a layer of a lubricative material having a thickness in the range of 20 to 500 Å and being made of a fluorine-containing compound having as a fundamental skeleton a perfluoroalkyl polyether is provided on said surface treatment layer.

3. A magnetic recording medium comprising a magnetic recording film formed on a substrate directly or with a protective layer therebetween, characterized in that a surface treatment layer having a thickness in the range of 5 to 500 Å and being made of a reaction product of an azide compound having as a fundamental skeleton partially or entirely fluorinated alkyl chain and at least one azido group is provided on said magnetic recording film directly or on a protective layer formed on said magnetic recording film.

* * * * *